(12) United States Patent
Yokoe

(10) Patent No.: US 11,530,759 B2
(45) Date of Patent: Dec. 20, 2022

(54) VALVE DEVICE

(71) Applicant: NIDEC SANKYO CORPORATION, Nagano (JP)

(72) Inventor: Satoru Yokoe, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 17/489,748

(22) Filed: Sep. 29, 2021

(65) Prior Publication Data

US 2022/0099215 A1 Mar. 31, 2022

(30) Foreign Application Priority Data

Sep. 30, 2020 (CN) .......................... 202022196407.X

(51) Int. Cl.
*F16K 31/54* (2006.01)
*F16K 31/04* (2006.01)

(52) U.S. Cl.
CPC .............. *F16K 31/54* (2013.01); *F16K 31/04* (2013.01)

(58) Field of Classification Search
CPC ...................................................... F16K 31/04
See application file for complete search history.

(56) References Cited

U.S. PATENT DOCUMENTS

| | | | |
|---|---|---|---|
| 6,125,885 A * | 10/2000 | Hirata | F25B 41/26 251/288 |
| 6,769,445 B2 | 8/2004 | Hashimoto et al. | |
| 7,316,384 B2 * | 1/2008 | Sekiya | F16K 11/0743 251/129.11 |
| 9,746,087 B2 * | 8/2017 | Yokoe | F16K 31/535 |

FOREIGN PATENT DOCUMENTS

JP 2003056734 2/2003

* cited by examiner

*Primary Examiner* — Eric Keasel
(74) *Attorney, Agent, or Firm* — JCIPRNET

(57) ABSTRACT

A valve device includes: a shell provided with a chamber formed on an inner surface with an inlet and first and second outlets; a valve core provided with a main abutting portion, and first and second separation portions that are separated by the main abutting portion; and a driving portion driving the valve core to rotate, The valve core includes an auxiliary abutting portion. The auxiliary abutting portion is arranged that the area of the surface of the first separation portion opposite to the valve seat surface is closer to the area of the surface of the second separation portion opposite to the valve seat surface when the auxiliary abutting portion is not provided.

10 Claims, 4 Drawing Sheets

VALVE DEVICE

CROSS REFERENCE TO RELATED APPLICATION

This application claims the benefit of China Application No. 202022196407.X, filed Sep. 30, 2020. The entirety of the above-mentioned patent application is hereby incorporated by reference herein and made a part of this specification.

BACKGROUND

Field of the Invention

The embodiment of the present invention relates to a valve device.

Description of the Related Documents

In the past, there is a valve device, including: a shell, wherein the shell is provided with a chamber formed on an inner surface with a fluid inlet for the inflow of fluid and a fluid outlet for the outflow of the fluid; a valve core, wherein the valve core is arranged in the chamber and is used for rotating to open and close the outlet; and a driving portion, wherein the driving portion drives the valve core to rotate.

As the above-mentioned valve device, for example, there is a device disclosed in the Japanese Patent Laid-Open No. 2003-56734, which includes two fluid outlets and two valve cores, the two fluid outlets are formed on a valve seat surface that serves as a part of the inner surface of the chamber, the two valve cores correspond to the two fluid outlets respectively, and each valve core is provided with an abutting portion and a separation portion, the abutting portion abuts against the valve seat surface, and the separation portion is opposite to the valve seat surface and forms a space communicating with the chamber between the valve seat surface. Thus, when the valve core rotates to a position where the separation portion is opposite to the fluid outlet, the fluid in the chamber can flow to the outside of the shell through the fluid outlet. In contrast, when the valve core rotates to a position where the abutting portion is opposite to the fluid outlet, the fluid in the chamber cannot flow to the outside of the shell through the fluid outlet.

In the above-mentioned device disclosed in the Japanese Patent Laid-Open No. 2003-56734, since a plurality of valve cores are provided, the number of components increases, which is likely to cause an increase in the manufacturing cost. To solve this problem, it can be considered that only one of the above-mentioned two valve cores is retained and two fluid outlets are arranged at the valve seat surface corresponding to the valve core, so that one valve core can be used for opening and closing the two fluid outlets. However, the inventor of the embodiment of the present invention finds in practice that, when only one of the above-mentioned two valve cores is retained and the two fluid outlets are arranged at the valve seat surface corresponding to the valve core, if the separation portion includes a first separation portion and a second separation portion, which are separated by the butting portion in the circumferential direction around the rotation axis of the valve core and have different sizes observed along the rotation axis of the valve core, if it is intended to use the valve core to open only one of the two fluid outlets and close the other fluid outlet, the valve core is easy to tilt due to the flow of the fluid (that is, the actual rotation axis of the valve core tilts relative to the designed rotation axis), and cannot seal the other fluid outlet well, resulting in fluid leakage at the other fluid outlet.

SUMMARY

The embodiment of the present invention is in view of the above-mentioned problems, and aims to provide a valve device, which is conducive to avoiding fluid leakage when a valve core tilts during rotation.

In order to achieve the above-mentioned purpose, the embodiment of the present invention provides a valve device, including: a shell, wherein the shell is provided with a chamber formed on an inner surface with an inlet for the inflow of fluid and an outlet for the outflow of the fluid; a valve core, wherein the valve core is arranged in the chamber and is used for rotating to open and close the outlet; and a driving portion, wherein the driving portion drives the valve core to rotate, the outlet includes a first outlet and a second outlet, the first outlet and the second outlet are formed on a valve seat surface that serves as a part of the inner surface, and are arranged in the circumferential direction around the first axis, that is, in the first circumferential direction, the valve core is provided with a main abutting portion, a first separation portion and a second separation portion, the main abutting portion is penetrated through by the first axis and abuts against the valve seat surface, the first separation portion and the second separation portion are separated by the main abutting portion in the first circumferential direction, and are opposite to the valve seat surface in order to form a space communicating with the chamber between the valve seat surface, the valve core can rotate between a first position and a second position around the first axis, at the first position, the first separation portion is opposite to the first outlet and the main abutting portion closes the second outlet, at the second position, the first separation portion is opposite to the second outlet and the main abutting portion closes the first outlet, the valve core is further provided with an auxiliary abutting portion that abuts against the valve seat surface, the auxiliary abutting portion is arranged on the outer circumferential side of the first outlet, so that when observed along the first axis, the area of the surface of the first separation portion opposite to the valve seat surface is closer to the area of the surface of the second separation portion opposite to the valve seat surface when the auxiliary abutting portion is not provided, and in a state where the first side of the main abutting portion in the first circumferential direction is adjacent to the first outlet and the first outlet is exposed, the auxiliary abutting portion overlaps the first outlet in the radial direction centered on the first axis or is closer to the second side in the first circumferential direction than the first outlet.

According to the valve device of the embodiment of the present invention, the valve core is further provided with the auxiliary abutting portion that abuts against the valve seat surface, the auxiliary abutting portion is arranged on the outer circumferential side of the first outlet, so that when observed along the first axis, the area of the surface of the first separation portion opposite to the valve seat surface is closer to the area of the surface of the second separation portion opposite to the valve seat surface when the auxiliary abutting portion is not provided, and in the state where the first side of the main abutting portion in the first circumferential direction is adjacent to the first outlet and the first outlet is exposed, the auxiliary abutting portion overlaps the first outlet in the radial direction centered on the first axis or is closer to the second side in the first circumferential direction than the first outlet. Therefore, when the valve core rotates to a position where one of the first outlet and the second outlet is closed and the other outlet is opened, even if the fluid flows in the space between the first separation portion and the valve seat surface and in the space between the second separation portion and the valve seat surface, the valve core is unlikely to tilt due to the flow of the fluid. Accordingly, it is easy to reliably close one of the first outlet and the second outlet to prevent the fluid from leaking through the gap between the outlet and the valve core; and it is also conducive to reducing the abrasion at the boundary between the main abutting portion and the first separation portion.

In addition, in the valve device of the embodiment of the present invention, preferably, the first side of the auxiliary abutting portion in the first circumferential direction is connected with the main abutting portion, and the second side of the auxiliary abutting portion in the first circumferential direction is separated from the main abutting portion.

In addition, in the valve device of the embodiment of the present invention, preferably, both the first side and the second side of the auxiliary abutting portion in the first circumferential direction are separated from the main abutting portion.

According to the valve device of the embodiment of the present invention, both the first side and the second side of the auxiliary abutting portion in the first circumferential direction are separated from the main abutting portion. Therefore, when the first separation portion is opposite to the first outlet or the second outlet, the fluid easily and quickly flows into the gap formed between the first separation portion and the valve seat surface, and the response speed of the valve device during switching is improved.

In addition, in the valve device of the embodiment of the present invention, preferably, the main abutting portion includes: a center portion, wherein the center portion is penetrated through by the first axis; a first extension portion, wherein the first extension portion extends from the center portion toward the outer circumferential side; and a second extension portion, wherein the second extension portion extends from the center portion toward the outer circumferential side and is separated from the first extension portion in the first circumferential direction, and the outer circumferential surface of the first extension portion, the outer circumferential surface of the second extension portion and the outer circumferential surface of the auxiliary abutting portion are located on the same circumference centered on the first axis.

According to the valve device of the embodiment of the present invention, the main abutting portion includes: the center portion, wherein the center portion is penetrated through by the first axis; the first extension portion, wherein the first extension portion extends from the center portion toward the outer circumferential side; and the second extension portion, wherein the second extension portion extends from the center portion toward the outer circumferential side and is separated from the first extension portion in the first circumferential direction, and the outer circumferential surface of the first extension portion, the outer circumferential surface of the second extension portion and the outer circumferential surface of the auxiliary abutting portion are located on the same circumference centered on the first axis. Therefore, when the valve core rotates to the position where one of the first outlet and the second outlet is closed and the other outlet is opened, it is easier to avoid the valve core from tilting, it is easier to reliably close one of the first outlet and the second outlet to prevent the fluid from leaking through the gap between the outlet and the valve core, and it is conducive to reducing the abrasion at the boundary between the main abutting portion and the first separation portion.

In addition, in the valve device of the embodiment of the present invention, preferably, when observed along the first axis, when the auxiliary contact portion is not provided, the area of the surface of the first separation portion opposite to the valve seat surface is greater than the area of the surface of the second separation portion opposite to the valve seat surface.

In addition, in the valve device of the embodiment of the present invention, preferably, the first outlet and the second outlet are located on the same circumference centered on the first axis, and the inlet is located on the side opposite to the first axis relative to the connecting line of the first outlet and the second outlet.

In addition, in the valve device of the embodiment of the present invention, preferably, the driving portion includes: a motor portion; and a gear transmission portion for transmitting the rotation of the motor portion to the valve core, the motor portion includes: a stator, wherein the stator is arranged on the outer side of the shell; and a rotor, wherein the rotor is arranged on the inner side of the shell and rotates relative to the stator, the gear transmission portion includes: a first gear, wherein the first gear is arranged on the inner side of the shell and is coaxially connected with the rotor; and a second gear, wherein the second gear is arranged on the inner side of the shell, is coaxially connected with the valve core, and transmits the rotation from the first gear to the valve core, and the first axis serving as the rotation axis of the second gear is parallel and staggered to the second axis serving as the rotation axis of the first gear.

In addition, in the valve device of the embodiment of the present invention, preferably, the shell includes: a valve seat component, wherein the valve seat component is formed with the valve seat surface, and is provided with a first hole portion constituting the first outlet, a second hole portion constituting the second outlet and a third hole portion constituting the inlet; and a cover portion, wherein the cover portion encloses the chamber together with the valve seat component, a spring component is arranged in the shell, the spring component is provided with a plate-shaped portion that is arranged on the side opposite to the valve seat component relative to the valve core in the extension direction of the first axis, the plate-shaped portion is provided with a cantilever-shaped plate spring portion, and the front end of the plate spring portion overlaps the valve core in the extension direction of the first axis and presses the valve core toward the valve seat component.

According to the valve device of the embodiment of the present invention, the spring component is arranged in the shell, the spring component is provided with the plate-shaped portion that is arranged on the side opposite to the valve seat component relative to the valve core in the extension direction of the first axis, the plate-shaped portion is provided with the cantilever-shaped plate spring portion, and the front end of the plate spring portion overlaps the valve core in the extension direction of the first axis and presses the valve core toward the valve seat component. Therefore, the direction of the force applied by the plate spring portion to the valve core is easy to deviate from the extension direction of the rotation axis of the valve core, but even so, by providing the auxiliary abutting portion, it is also easy to avoid the valve core from tilting to generate fluid leakage during rotation. In addition, in the valve device of the embodiment of the present invention, preferably, the plate spring portion extends in the circumferential direction around the second axis, that is, in the second circumferential direction, and the second axis is parallel and staggered to the first axis.

In addition, in the valve device of the embodiment of the present invention, preferably, the driving portion includes: a motor portion; and a gear transmission portion for transmitting the rotation of the motor portion to the valve core, the motor portion includes: a stator, wherein the stator is arranged on the outer side of the shell; and a rotor, wherein the rotor is arranged on the inner side of the shell and rotates relative to the stator, the gear transmission portion includes: a first gear, wherein the first gear is arranged on the inner side of the shell and is coaxially connected with the rotor; and a second gear, wherein the second gear is arranged on the inner side of the shell, is coaxially connected with the valve core through a clamping structure, and transmits the rotation from the first gear to the valve core, and the first axis serving as the rotation axis of the second gear is parallel and staggered to the second axis serving as the rotation axis of the first gear.

(The Effect of the Embodiment of the Present Invention)

According to the embodiment of the present invention, the valve core is further provided with the auxiliary abutting portion that abuts against the valve seat surface, the auxiliary abutting portion is arranged on the outer circumferential side of the first outlet, so that when observed along the first axis, the area of the surface of the first separation portion opposite to the valve seat surface is closer to the area of the surface of the second separation portion opposite to the valve seat surface when the auxiliary abutting portion is not provided, and in the state where the first side of the main abutting portion in the first circumferential direction is adjacent to the first outlet and the first outlet is exposed, the auxiliary abutting portion overlaps the first outlet in the radial direction centered on the first axis or is closer to the second side in the first circumferential direction than the first outlet. Therefore, when the valve core rotates to the position where one of the first outlet and the second outlet is closed and the other outlet is opened, even if the fluid flows in the space between the first separation portion and the valve seat surface and in the space between the second separation portion and the valve seat surface, the valve core is unlikely to tilt due to the flow of the fluid. Accordingly, it is easy to reliably close one of the first outlet and the second outlet to prevent the fluid from leaking through the gap between the outlet and the valve core; and it is also conducive to reducing the abrasion at the boundary between the main abutting portion and the first separation portion.

DETAILED DESCRIPTION

Figure 1:
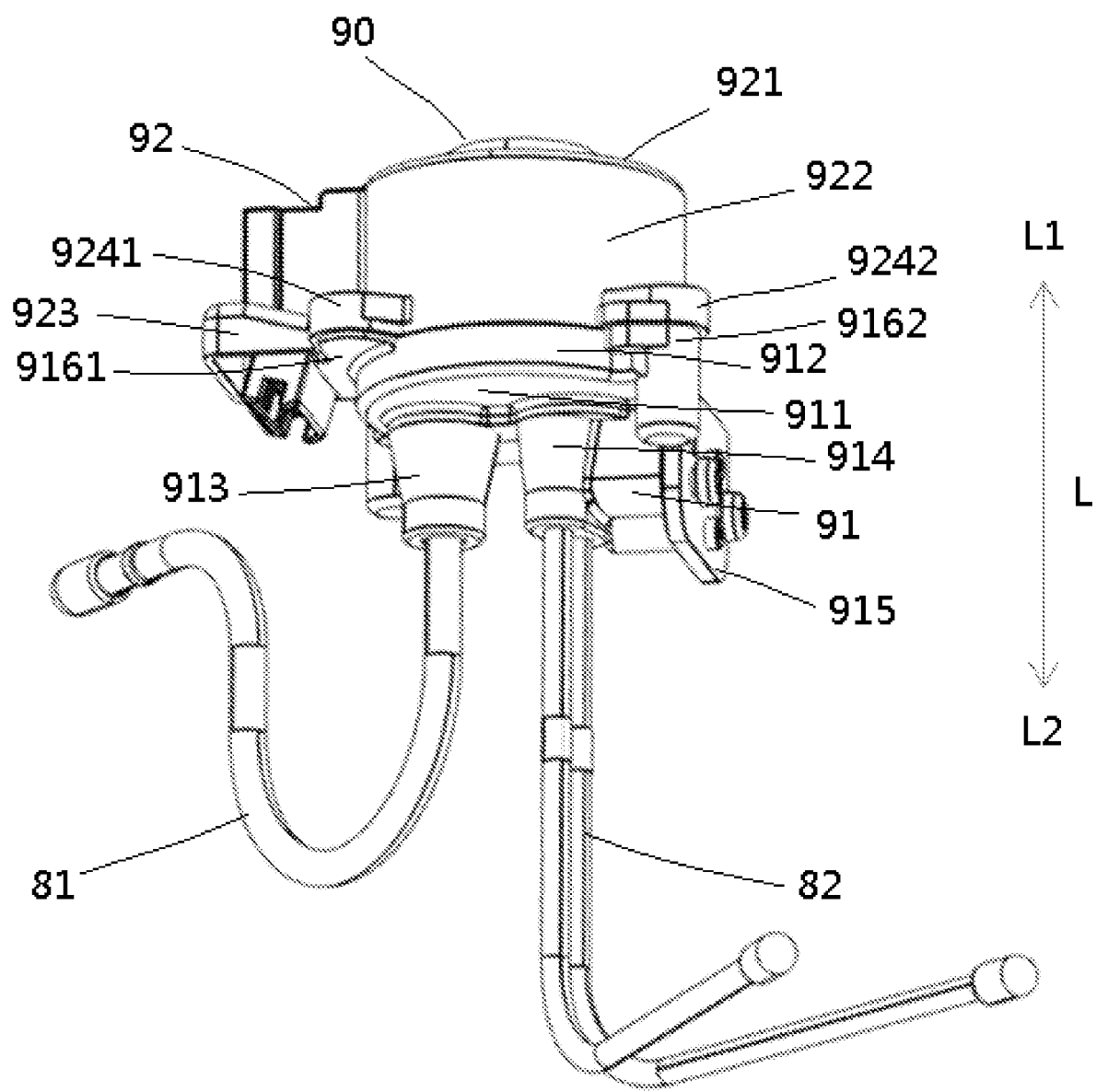
FIG. 1 is a three-dimensional diagram schematically showing a valve device according to an embodiment of the present invention.
Figure 2:
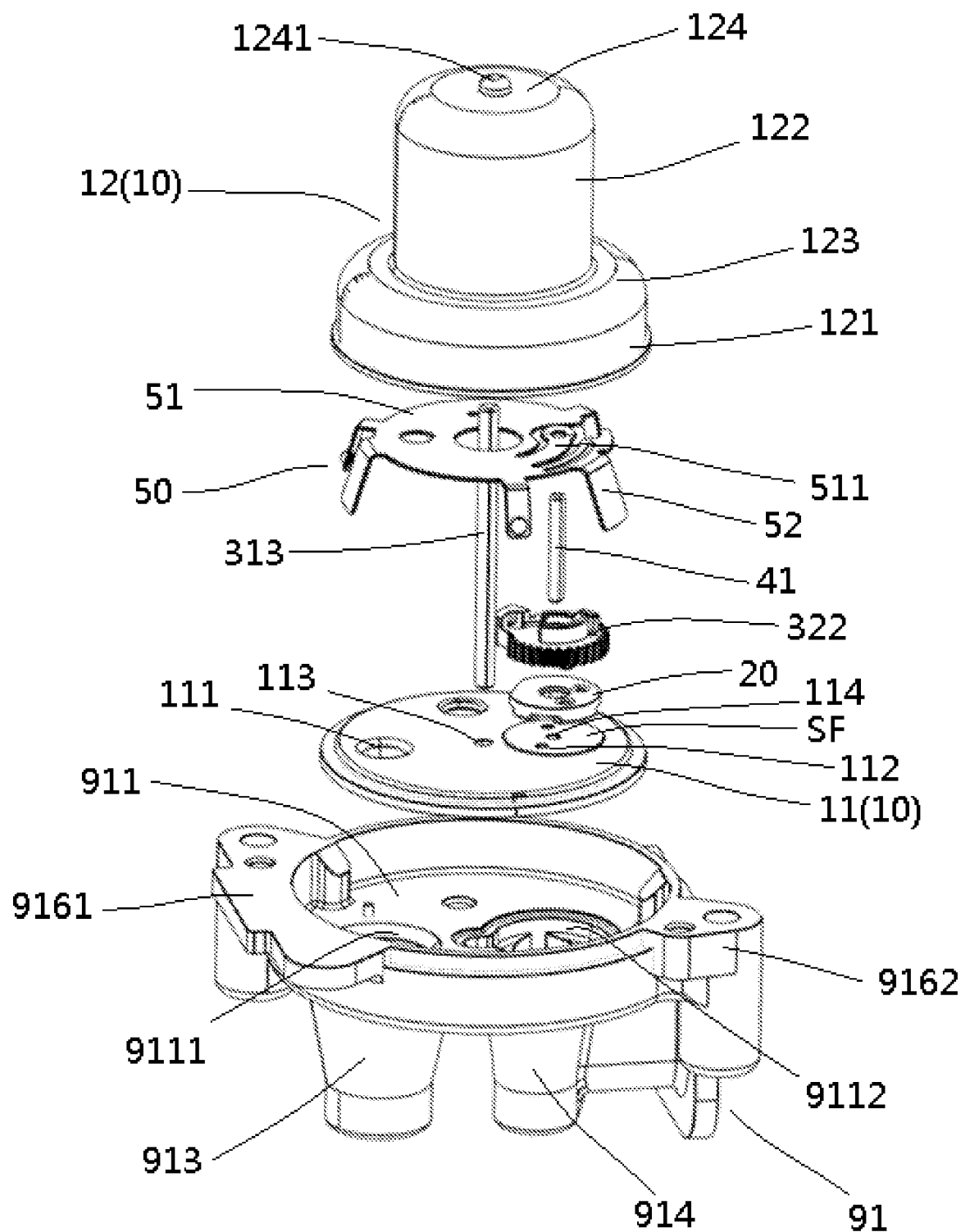
FIG. 2 is an exploded three-dimensional diagram schematically showing the main part of the valve device according to the embodiment of the present invention.
Figure 3:
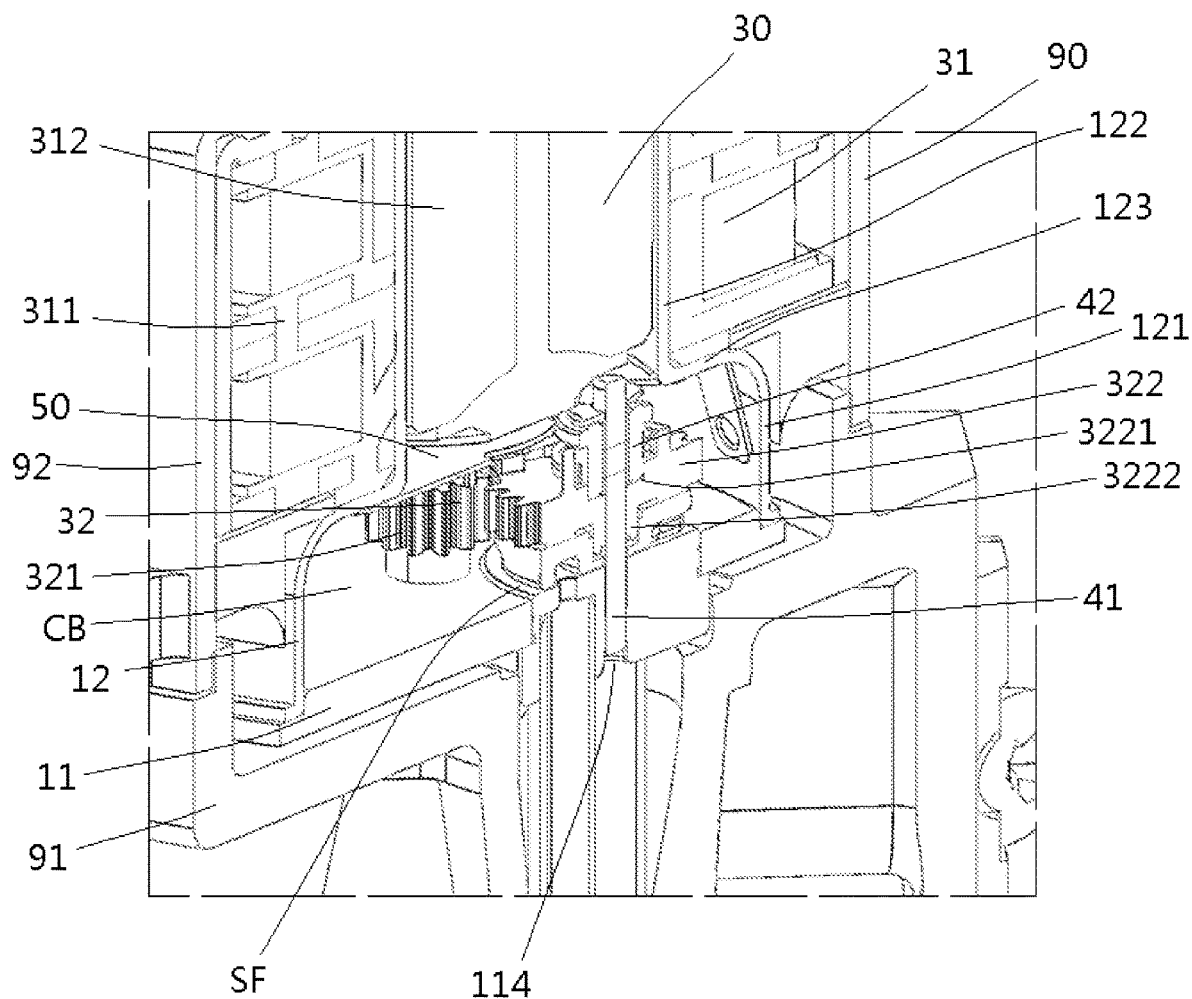
FIG. 3 is a partial cross-sectional view schematically showing the valve device according to the embodiment of the present invention.
Figure 4:
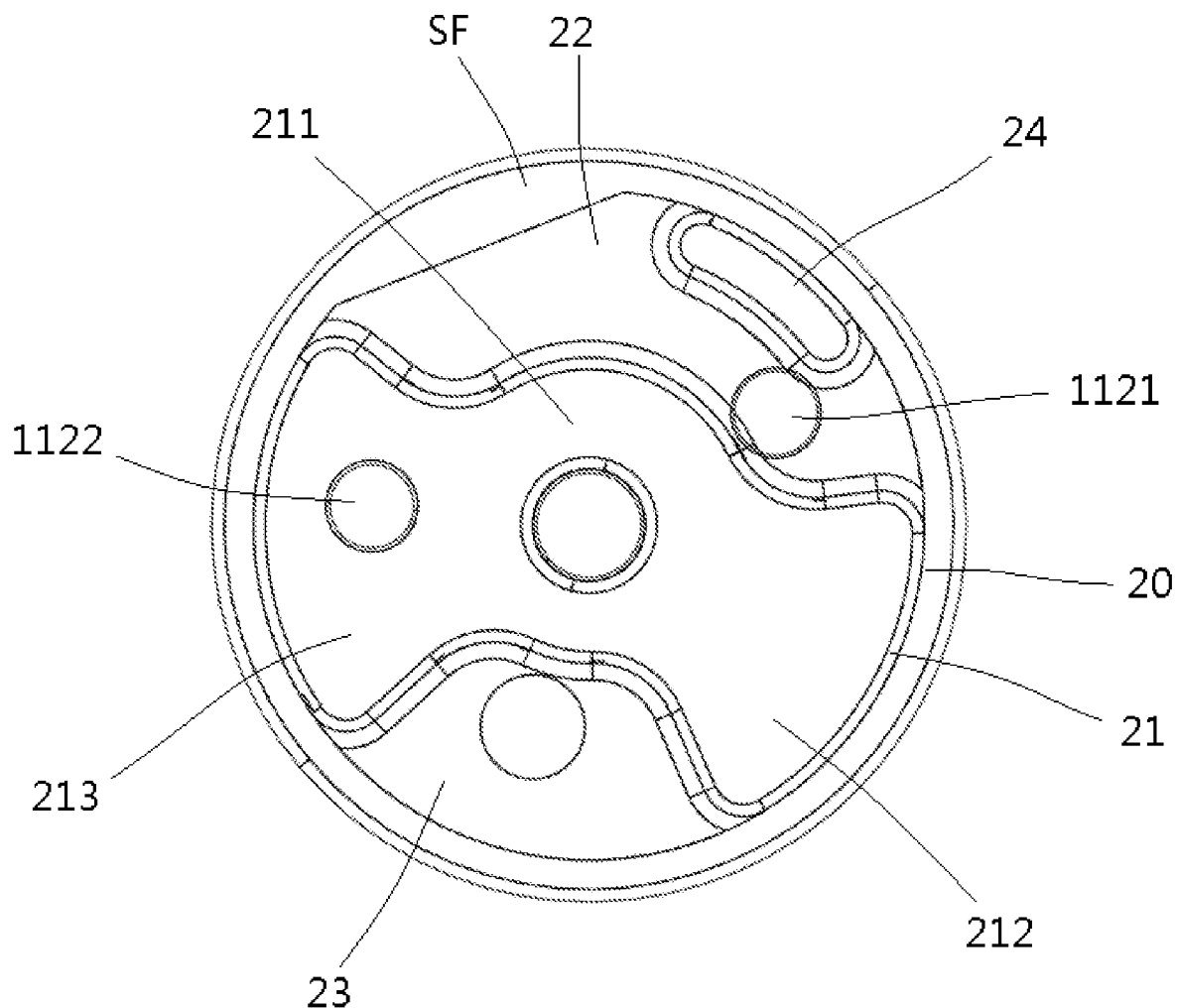
FIG. 4 is a vertical view schematically showing the positional relationship among a valve core, a first outlet and a second outlet in the valve device according to the embodiment of the present invention, and showing a valve seat component in a transparent manner.

Hereinafter, a valve device according to an embodiment of the present invention will be described in combination with FIG. 1 to FIG. 4, wherein FIG. 1 is a three-dimensional diagram schematically showing the valve device according to the embodiment of the present invention, FIG. 2 is an exploded three-dimensional diagram schematically showing the main part of the valve device according to the embodiment of the present invention, FIG. 3 is a partial cross-sectional view schematically showing the valve device according to the embodiment of the present invention, and FIG. 4 is a vertical view schematically showing the positional relationship among a valve core, a first outlet and a second outlet in the valve device according to the embodiment of the present invention, and showing a valve seat component in a transparent manner.

Here, for the convenience of description, the upper and lower direction in FIG. 1 is set as an L direction, one side of the L direction is set as L1, the other side of the L direction is set as L2, and the L direction is parallel to the extension direction of the rotation axis of the valve core of the valve device.

(The Overall Structure of the Valve Device)

As shown in FIG. 1 to FIG. 3, the valve device 1 includes: a shell 10, wherein the shell 10 is provided with a chamber CB formed on an inner surface with an inlet 111 for the inflow of fluid and an outlet 112 for the outflow of the fluid; a valve core 20, wherein the valve core 20 is arranged in the chamber CB and is used for rotating to open and close the outlet 112; and a driving portion 30, wherein the driving portion 30 drives the valve core 20 to rotate. Here, as shown in FIG. 1, the valve device 1 further includes a housing 90, wherein the housing 90 accommodates the shell 10 and is provided with a fluid inlet portion 913 and a fluid outlet portion 914, a fluid inlet pipe 81 (for example, composed of a flexible pipe) is connected to the fluid inlet portion 913, two fluid output pipes 82 (for example, composed of flexible pipes) are connected to the fluid outlet portion 914.

In addition, as shown in FIG. 4, the outlet 112 includes a first outlet 1121 and a second outlet 1122, the first outlet 1121 and the second outlet 1122 are formed on a valve seat surface that serves as a part of the inner surface of the chamber CB, and are arranged around the rotation axis of the valve core 20, that is, the circumferential direction of the first axis, that is, the first circumferential direction.

(The Structure of the Housing)

As shown in FIG. 1 and FIG. 2, the housing 90 includes a first housing 91 and a second housing 92.

In addition, as shown in FIG. 1 and FIG. 2, the first housing 91 is provided with a bottom wall portion 911 vertical to the L direction and a peripheral wall portion 912 extending from the peripheral edge of the bottom wall portion 911 toward the L1 direction. When observed along the L direction, the bottom wall portion 911 is substantially circular, and the peripheral wall portion 912 is substantially cylindrical. Furthermore, a position on the bottom wall portion 911 closer to the inner circumferential side than the outer circumferential edge is provided with a first through hole 9111 and a second through hole 9112, which penetrate through the bottom wall portion 911 along the L direction, and the surface of the bottom wall portion 911 on the L2 direction side is formed with a tubular fluid inlet portion 913 and a tubular fluid outlet portion 914 extending toward the L2 direction in a manner of surrounding the first through hole 9111 and the second through hole 9112, respectively. Furthermore, the first housing 91 is provided with a connecting portion 915 for connecting with an external device not shown or the like, and the connecting portion 915 is connected with the bottom wall portion 911, the peripheral wall portion 912 and the fluid outlet portion 914. Furthermore, a first fixing portion 9161 and a second fixing portion 9162 protruding toward the outer circumferential side are formed at the end portion of the peripheral wall portion 912 in the L1 direction, and the first fixing portion 9161 and the second fixing portion 9162 are separated from each other.

In addition, as shown in FIG. 1, the second housing 92 is assembled on the first housing 91 from the L1 direction side, so that a space for accommodating the shell 10 and the part of the driving portion 30 located on the outer side of the shell 10 is formed between the first housing 91 and the second housing 92. The second housing 92 is provided with a top wall portion 921 vertical to the L direction and a peripheral wall portion 922 extending from the peripheral edge of the top wall portion 921 toward the L2 direction. Furthermore, the second housing 92 is provided with a connector portion 923 protruding from the peripheral wall portion 922 toward the outer circumferential side. Furthermore, the end portion of the peripheral wall portion 922 on the L2 direction side is provided with a third fixing portion 9241 and a fourth fixing portion 9242, which protrude toward the outer circumferential side, the third fixing portion 9241 and the fourth fixing portion 9242 are separated from each other, the third fixing portion 9241 corresponds to the first fixing portion 9161, and the fourth fixing portion 9242 corresponds to the second fixing portion 9162.

In addition, when the first housing 91 and the second housing 92 are assembled, as shown in FIG. 1 and FIG. 3, the end portion of the peripheral wall portion 922 on the L2 direction side abuts against the end portion of the peripheral wall portion 911 on the L1 direction side, further, the third fixing portion 9241 abuts against the first fixing portion 9161, and the fourth fixing portion 9242 abuts against the second fixing portion 9162. In this state, the third fixing portion 9241 is connected with the first fixing portion 9161, and the fourth fixing portion 9242 is connected with the second fixing portion 9162 by using screws that are not shown, so that the first housing 91 and the second housing 92 can be fixed together.

(The Structure of the Shell)

As shown in FIG. 2, the shell 10 includes: a valve seat component 11, wherein the valve seat component 11 is formed with a valve seat surface SF that serves as a part of the inner surface of the chamber CB, and is provided with a first hole portion constituting the first outlet 1121, a second hole portion constituting the second outlet 1122 and a third hole portion constituting the inlet 111; and a cover portion 12, wherein the cover portion 12 encloses the chamber CB together with the valve seat component 11. Furthermore, when observed along the L direction, the first hole portion constituting the first outlet 1121 and the second hole portion constituting the second outlet 1122 overlap the second through hole 9112 of the bottom wall portion 911, and the third hole portion constituting the inlet 111 overlaps the first through hole 9111 of the bottom wall portion 911. Furthermore, when observed along the L direction, the third hole portion constituting the inlet 111 is located on the side opposite to the rotation axis of the valve core 20 relative to the connecting line between the first hole portion constituting the first outlet 1121 and the second hole portion constituting the second outlet 1122, that is to say, the inlet is located on the side opposite to the rotation axis (i.e., the first axis) of the valve core 20 relative to the connecting line between the first outlet 1121 and the second outlet 1122.

In addition, as shown in FIG. 2, when observed along the L direction, the valve seat component 11 is substantially circular, a valve seat center hole 113 is formed in the center of the valve seat component 11, a through hole 114 is formed in a position of the valve seat component 11 deviating from its center, the through hole 114 enables a fulcrum shaft 41 supporting the valve core 20 to penetrate through, and the center axis of the through hole 114 is consistent with the rotation axis of the valve core 20. Furthermore, as shown in FIG. 4, the first outlet 1121 and the second outlet 1122 are located on the same circumference centered on the rotation axis of the valve core 20. Furthermore, a step portion is formed on the outer circumferential portion of the valve seat component 11.

In addition, as shown in FIG. 3, the valve seat component 11 abuts against the bottom wall portion 911 of the first housing 91 from the L1 direction side, and is surrounded by the peripheral wall portion 912 of the first housing 91. In addition, as shown in FIG. 2, the cover portion 12 is provided with a large-diameter cylindrical portion 121, a small-diameter cylindrical portion 122 that is closer to the L1 direction side than the large-diameter cylindrical portion 121 and has a diameter smaller than that of the large-diameter cylindrical portion 121, an annular portion 123 for connecting the large-diameter cylindrical portion 121 with the small-diameter cylindrical portion 122, and an end plate portion 124 that closes the opening of the small-diameter cylindrical portion 122 in the L1 direction. Furthermore, a supporting portion 1241 is arranged at the center of the end plate portion 124. Furthermore, the end portion of the large-diameter cylindrical portion 121 of the cover portion 12 on the L2 direction side abuts against the step portion of the outer circumferential portion of the valve seat component 11 in the L direction and in a direction perpendicular to the L direction.

(The Structure of the Driving Portion and the Periphery Thereof)

As shown in FIG. 2 and FIG. 3, the driving portion 30 includes: a motor portion 31; and a gear transmission portion 32 for transmitting the rotation of the motor portion 31 to the valve core 20.

In addition, as shown in FIG. 3, the motor portion 31 includes: a stator 311, wherein the stator 311 is arranged on the outer side of the shell 10; and a rotor 312, wherein the rotor 312 is arranged on the inner side of the shell 10 and rotates relative to the stator 311. Specifically, the stator 311 is arranged between the small-diameter cylindrical portion 122 of the shell 10 and the second housing 92 of the housing 90, the end surface of the stator 311 on the L1 direction side abuts against the top wall portion 921 of the second housing 92, and the inner circumferential side of the end surface of the stator 311 on the L2 direction side abuts against the annular portion 123 of the shell 10. Furthermore, the rotor 312 is arranged coaxially with the small-diameter cylindrical portion 122 of the shell 10 on the inner side of the small-diameter cylindrical portion 122, the rotor 312 is rotatably supported by the fulcrum shaft 313, the end portion of the fulcrum shaft 313 on the L1 direction side is supported by the supporting portion 1241 of the end plate portion 124, and the end portion of the fulcrum shaft 313 on the L2 direction side is supported by the valve seat center hole 113 of the valve seat component 11.

In addition, as shown in FIG. 2 and FIG. 3, the gear transmission portion 32 includes: a first gear 321, wherein the first gear 321 is arranged on the inner side of the shell 10 and is coaxially connected with the rotor 312; and a second gear 322, wherein the second gear 322 is arranged on the inner side of the shell 10, is coaxially connected with the valve core 20, and transmits the rotation from the first gear 321 to the valve core 20. Specifically, the first gear 321 is fixed on the L2 direction side of the rotor 312 and is penetrated through by the fulcrum shaft 313, the rotation axis (i.e., the second axis) of the first gear 321 is consistent with the rotation axis of the rotor 312, the second gear 322 is arranged on the L1 direction side of the valve core 20, is connected with the valve core 20 through a clamping structure and is penetrated through by a fulcrum shaft 41, the end portion of the fulcrum shaft 41 on the L1 direction side is supported by a spring component 50, and the end portion of the fulcrum shaft 41 on the L2 direction side is supported by the through hole 114 of the valve seat component 11. Furthermore, the rotation axis of the second gear 322 is consistent with the rotation axis of the valve core 20. Furthermore, the first axis serving as the rotation axis of the second gear 322 is parallel and staggered to the second axis serving as the rotation axis of the first gear 321.

In addition, as shown in FIG. 2 and FIG. 3, the spring component 50 is arranged in the shell 10, the spring component 50 is provided with a plate-shaped portion 51 that is arranged on the side opposite to the valve seat component 11 relative to the valve core 20 in the L direction, the plate-shaped portion 51 is provided with a cantilever-shaped plate spring portion 511, and the front end of the plate spring portion 511 overlaps the valve core 20 in the L direction and presses the valve core 20 toward the valve seat component 11. Specifically, as shown in FIG. 2 and FIG. 3, the plate-shaped portion 51 has a ring shape provided with a center hole for enabling the fulcrum shaft 313 to penetrate through, the plate spring portion 511 extends in the circumferential direction around the rotation axis (i.e., the second axis) of the rotor 312, and the front end of the plate spring portion 511 is provided with a through hole for enabling the fulcrum shaft 41 to penetrate through. Furthermore, a shaft sleeve 42 through which the fulcrum shaft 41 penetrates is arranged between the front end of the plate spring portion 511 and the second gear 322, the end portion of the shaft sleeve 42 on the L1 direction side abuts against the front end of the plate spring portion 511, and the end portion of the shaft sleeve 42 on the L2 direction side is embedded into a recess portion 3221 arranged on the end surface of the second gear 322 on the L1 direction side.

In addition, as shown in FIG. 2 and FIG. 3, the spring component 50 is provided with a plurality of elongated legs 52 extending from a plurality of positions on the outer circumferential edge of the plate-shaped portion 51 toward the valve seat component 11 side. In a natural state, these legs 52 tilt relative to the plate-shaped portion 51, so that the closer to the valve seat component 11, the legs tilt more toward the outer circumferential side. When the spring component 50 is assembled in the shell 10, the front ends of the plurality of legs 52 of the spring component 50 are elastically pressed by the large-diameter cylindrical portion 121 of the cover portion 12 of the shell 10.

(The Structure of the Valve Core)

As shown in FIG. 4, the valve core 20 is provided with a main abutting portion 21, a first separation portion 22 and a second separation portion 23. Furthermore, the main abutting portion 21 is penetrated through by the rotation axis (i.e., the first axis) of the valve core 20 and abuts against the valve seat surface SF, the first separation portion 22 and the second separation portion 23 are separated by the main abutting portion 21 in the circumferential direction around the rotation axis of the valve core 20, and are opposite to the valve seat surface SF to form a space communicating with the chamber CB between the valve seat surface SF. Furthermore, the valve core 20 can rotate around its axis between a first position and a second position, at the first position, the first separation portion 22 is opposite to the first outlet 1121 and the main abutting portion 21 closes the second outlet 1122, and at the second position, the first separation portion 22 is opposite to the second outlet 1122 and the main abutting portion 21 closes the first outlet 1121.

In addition, as shown in FIG. 4, the valve core 20 is further provided with an auxiliary abutting portion 24 that abuts against the valve seat surface SF, the auxiliary abutting portion 24 is arranged on the outer circumferential side of the first outlet, so that when observed along the axis of the valve core 20, the area of the surface of the first separation portion 22 opposite to the valve seat surface SF is closer to the area of the surface of the second separation portion 23 opposite to the valve seat surface SF when the auxiliary abutting portion 24 is not provided (that is to say, when a part of the auxiliary abutting portion 24 becomes a part of the first separation portion 22), and in a state where the first side (the clockwise side in FIG. 4) of the main abutting portion 21 in the circumferential direction around the rotation axis of the valve core 20 is adjacent to the first outlet 1121 and the first outlet 1121 is exposed, the auxiliary abutting portion 24 is closer to the second side (the counterclockwise side in FIG. 4) in the circumferential direction around the rotation axis of the valve core 20 than the first outlet 1121.

In addition, as shown in FIG. 4, the main abutting portion 21 includes: a center portion 211, wherein the rotation axis of the valve core 20 passes through the center portion 211 (in the shown example, the maximum radius size of the surface of the center portion 211 abutting against the valve seat surface SF is less than the distance of the connecting lines of the innermost circumferential side portions of the first opening 1121 and the second opening 1122 with the rotation axis of the valve core 20); a first extension portion 212, wherein the first extension portion 212 extends from the center portion 211 toward the outer circumferential side; and a second extension portion 231, wherein the second extension portion 213 extends from the center portion 211 toward the outer circumferential side and is separated from the first extension portion 212 in the circumferential direction around the rotation axis of the valve core 20. Furthermore, as shown in FIG. 4, the outer circumferential surface of the first extension portion 212, the outer circumferential surface of the second extension portion 213 and the outer circumferential surface of the auxiliary abutting portion 24 are located on the same circumference centered on the rotation axis of the valve core 20. Furthermore, as shown in FIG. 3, in the surface of the valve core 20 on the L1 direction side, a recess portion is formed in a portion overlapping the center portion 211, and the recess portion is used for embedding a protrusion portion 3222 formed at the center of the surface of the second gear 322 on the L2 direction side.

In addition, as shown in FIG. 4, both the first side and the second side of the auxiliary abutting portion 24 in the circumferential direction around the rotation axis of the valve core 20 are separated from the main abutting portion 21. Furthermore, as shown in FIG. 4, the auxiliary abutting portion 24 extends in the circumferential direction around the rotation axis of the valve core 20, and the outer circumferential surface of the auxiliary abutting portion 24, the outer circumferential surface of the first extension portion 212 and the outer circumferential surface of the second extension portion 213 are located on the same circumference centered on the rotation axis of the valve core 20.

In addition, as shown in FIG. 4, when observed along the rotation axis of the valve core 20, when the auxiliary abutting portion 24 is not provided, the area of the surface of the first separation portion 22 opposite to the valve seat surface SF is greater than the area of the surface of the second separation portion 23 opposite to the valve seat surface SF. Furthermore, as shown in FIG. 4, the part of the outer circumferential surface of the first separation portion 22 located between the main abutting portion 21 and the auxiliary abutting portion 24 is a plane.

In addition, as shown in FIG. 4, when observed along the rotation axis of the valve core 20, the surface of the second separation portion 23 opposite to the valve seat surface SF is substantially fan-shaped. Furthermore, when observed along the rotation axis of the valve core 20, the outer circumferential surface of the second separation portion 23, the outer circumferential surface of the first extension portion 212 and the outer circumferential surface of the second extension portion 213 are located on the same circumference centered on the rotation axis of the valve core 20.

(Main Effects of this Embodiment)

According to the valve device 1 of the this embodiment, the valve core 20 is provided with the auxiliary abutting portion 24 that abuts against the valve seat surface SF, the auxiliary abutting portion 24 is arranged on the outer circumferential side of the first outlet 1121, so that when observed along the rotation axis of the valve core 20, the area of the surface of the first separation portion 22 opposite to the valve seat surface SF is closer to the area of the surface of the second separation portion 23 opposite to the valve seat surface SF when the auxiliary abutting portion 24 is not provided, and in the state where the first side (the clockwise direction in FIG. 4) of the main abutting portion in the circumferential direction around the rotation axis of the valve core 20 is adjacent to the first outlet 1121 and the first outlet 1121 is exposed, the auxiliary abutting portion 24 is closer to the second side (the counterclockwise direction in FIG. 4) in the circumferential direction centered on the rotation axis of the valve core 20 than the first outlet 1121. Therefore, when the valve core 20 rotates to a position where one of the first outlet 1121 and the second outlet 1122 is closed and the other outlet is opened, even if the fluid flows in the space between the first separation portion 22 and the valve seat surface SF and in the space between the second separation portion 23 and the valve seat surface SF, the valve core 20 is unlikely to tilt due to the flow of the fluid. Accordingly, it is easy to reliably close one of the first outlet 1121 and the second outlet 1122 to prevent the fluid from leaking through the gap between the outlet and the valve core 20; and it is also conducive to reducing the abrasion at the boundary between the main abutting portion 21 and the first separation portion 22.

The embodiment of the present invention is exemplarily described above in conjunction with the drawings. Obviously, the specific implementation of the embodiment of the present invention is not limited by the above-mentioned embodiment.

For example, in the above-mentioned embodiment, the driving portion 30 includes: the motor portion 31; and the gear transmission portion 32 for transmitting the rotation of the motor portion 31 to the valve core 20, the gear transmission portion 32 includes: the first gear 321, wherein the first gear 321 is arranged on the inner side of the shell 10 and is coaxially connected with the rotor 312; and the second gear 322, wherein the second gear 322 is arranged on the inner side of the shell 10, is coaxially connected with the valve core 20, and transmits the rotation from the first gear 321 to the valve core 20. But it is not limited thereto, the gear transmission portion 32 can also transmit the rotation of the motor portion 31 to the valve core 20 through more than three gears, the gear transmission portion 32 can also be omitted according to circumferences, and the valve core 20 is directly connected with the rotor 312 of the motor portion 31.

In addition, in the above-mentioned embodiment, in the state where the first side of the main abutting portion 21 in the circumferential direction around the rotation axis of the valve core 20 is adjacent to the first outlet 1121 and the first outlet 1121 is exposed, the auxiliary abutting portion 24 is closer to the second side in the circumferential direction around the rotation axis of the valve core 20 than the first outlet 1121. But it is not limited thereto, it can also be formed such that in the state where the first side of the main abutting portion 21 in the circumferential direction around the rotation axis of the valve core 20 is adjacent to the first outlet 1121 and the first outlet 1121 is exposed, the auxiliary abutting portion 24 overlaps the first outlet 1121 in the radial direction centered on the rotation axis of the valve core 20.

In addition, in the above-mentioned embodiment, both the first side and the second side of the auxiliary abutting portion 24 in the circumferential direction around the rotation axis of the valve core 20 are separated from the main abutting portion 21, but it is not limited thereto, for example, it can also be formed such that the first side of the auxiliary abutting portion 24 in the circumferential direction around the rotation axis of the valve core 20 is connected with the main abutting portion 21, and the second side of the auxiliary abutting portion 24 in the circumferential direction around the rotation axis of the valve core 20 is separated from the main abutting portion 21.

In addition, in the above-mentioned embodiment, the outer circumferential surface of the first extension portion 212, the outer circumferential surface of the second extension portion 213 and the outer circumferential surface of the auxiliary abutting portion 24 are located on the same circumference centered on the rotation axis of the valve core 20, but it is not limited to thereto, and the outer circumferential surface of the first extension portion 212, the outer circumferential surface of the second extension portion 213 and the outer circumferential surface of the auxiliary abutting portion 24 can also be not located on the same circumference centered on the rotation axis of the valve core 20.

In addition, in the above-mentioned embodiment, a part of the outer circumferential surface of the first separation portion 22 located between the main abutting portion 21 and the auxiliary abutting portion 24 is a plane, but it is not limited to thereto, it can also be formed such that the entire outer circumferential surface of the first separation portion 22, the outer circumferential surface of the first extension portion 212 and the outer circumferential surface of the second extension portion 213 are located on the same circumference centered on the rotation axis of the valve core 20.

In addition, in the above-mentioned embodiment, the second gear 322 is connected with the valve core 20 through the clamping structure, but it is not limited to thereto, for example, the second gear 322 can also be connected with the valve core 20 by screws or the like.

It should be understood that within the scope of the embodiment of the present invention, various parts in the embodiment can be freely combined, or various parts in the embodiment can be appropriately deformed or omitted.

What is claimed is:

1. A valve device, comprising: a shell, wherein the shell is provided with a chamber formed on an inner surface with an inlet for the inflow of fluid and an outlet for the outflow of the fluid; a valve core, wherein the valve core is arranged in the chamber and is used for rotating to open and close the outlet; and a driving portion, wherein the driving portion drives the valve core to rotate, wherein, the outlet comprises a first outlet and a second outlet, the first outlet and the second outlet are formed on a valve seat surface that serves as a part of the inner surface, and are arranged in the circumferential direction around the first axis, that is, in the first circumferential direction, the valve core is provided with a main abutting portion, a first separation portion and a second separation portion, the main abutting portion is penetrated through by the first axis and abuts against the valve seat surface, the first separation portion and the second separation portion are separated by the main abutting portion in the first circumferential direction, and are opposite to the valve seat surface in order to form a space communicating with the chamber between the valve seat surface, the valve core can rotate between a first position and a second position around the first axis, at the first position, the first separation portion is opposite to the first outlet and the main abutting portion closes the second outlet, at the second position, the first separation portion is opposite to the second outlet and the main abutting portion closes the first outlet, the valve core is further provided with an auxiliary abutting portion that abuts against the valve seat surface, the auxiliary abutting portion is arranged on the outer circumferential side of the first outlet, so that when observed along the first axis, the area of the surface of the first separation portion opposite to the valve seat surface is closer to the area of the surface of the second separation portion opposite to the valve seat surface when the auxiliary abutting portion is not provided, and in a state where the first side of the main abutting portion in the first circumferential direction is adjacent to the first outlet and the first outlet is exposed, the auxiliary abutting portion overlaps the first outlet in the radial direction centered on the first axis or is closer to the second side in the first circumferential direction than the first outlet.

2. The valve device of claim 1, wherein, the first side of the auxiliary abutting portion in the first circumferential direction is connected with the main abutting portion, and the second side of the auxiliary abutting portion in the first circumferential direction is separated from the main abutting portion.

3. The valve device of claim 1, wherein, both the first side and the second side of the auxiliary abutting portion in the first circumferential direction are separated from the main abutting portion.

4. The valve device of claim 1, wherein, the main abutting portion comprises:

a center portion, wherein the center portion is penetrated through by the first axis;

a first extension portion, wherein the first extension portion extends from the center portion toward the outer circumferential side; and a second extension portion, wherein the second extension portion extends from the center portion toward the outer circumferential side and is separated from the first extension portion in the first circumferential direction, and the outer circumferential surface of the first extension portion, the outer circumferential surface of the second extension portion and the outer circumferential surface of the auxiliary abutting portion are located on the same circumference centered on the first axis.

5. The valve device of claim 1, wherein, when observed along the first axis, when the auxiliary contact portion is not provided, the area of the surface of the first separation portion opposite to the valve seat surface is greater than the area of the surface of the second separation portion opposite to the valve seat surface.

6. The valve device of claim 1, wherein, the first outlet and the second outlet are located on the same circumference centered on the first axis, and the inlet is located on the side opposite to the first axis relative to the connecting line of the first outlet and the second outlet.

7. The valve device of claim 1, wherein, the driving portion comprises:

a motor portion; and a gear transmission portion for transmitting the rotation of the motor portion to the valve core, the motor portion comprises:

a stator, wherein the stator is arranged on the outer side of the shell; and a rotor, wherein the rotor is arranged on the inner side of the shell and rotates relative to the stator, the gear transmission portion comprises:

a first gear, wherein the first gear is arranged on the inner side of the shell and is coaxially connected with the rotor; and a second gear, wherein the second gear is arranged on the inner side of the shell, is coaxially connected with the valve core, and transmits the rotation from the first gear to the valve core, and the first axis serving as the rotation axis of the second gear is parallel and staggered to the second axis serving as the rotation axis of the first gear.

8. The valve device of claim 1, wherein, the shell comprises:

a valve seat component, wherein the valve seat component is formed with the valve seat surface, and is provided with a first hole portion constituting the first outlet, a second hole portion constituting the second outlet and a third hole portion constituting the inlet; and a cover portion, wherein the cover portion encloses the chamber together with the valve seat component, a spring component is arranged in the shell, the spring component is provided with a plate-shaped portion that is arranged on the side opposite to the valve seat component relative to the valve core in the extension direction of the first axis, the plate-shaped portion is provided with a cantilever-shaped plate spring portion, and the front end of the plate spring portion overlaps the valve core in the extension direction of the first axis and presses the valve core toward the valve seat component.

9. The valve device of claim 8, wherein, the plate spring portion extends in the circumferential direction around the second axis, that is, in the second circumferential direction, and the second axis is parallel and staggered to the first axis.

10. The valve device of claim 9, wherein, the driving portion comprises:

a motor portion; and a gear transmission portion for transmitting the rotation of the motor portion to the valve core, the motor portion comprises:

a stator, wherein the stator is arranged on the outer side of the shell; and a rotor, wherein the rotor is arranged on the inner side of the shell and rotates relative to the stator, the gear transmission portion comprises:

a first gear, wherein the first gear is arranged on the inner side of the shell and is coaxially connected with the rotor; and a second gear, wherein the second gear is arranged on the inner side of the shell, is coaxially connected with the valve core through a clamping structure, and transmits the rotation from the first gear to the valve core, and the first axis serving as the rotation axis of the second gear is parallel and staggered to the second axis serving as the rotation axis of the first gear.

* * * * *